US009858676B2

(12) United States Patent
Bostick et al.

(10) Patent No.: US 9,858,676 B2
(45) Date of Patent: Jan. 2, 2018

(54) DISPLAYING LOCATION-BASED RULES ON AUGMENTED REALITY GLASSES

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/592,333

(22) Filed: Jan. 8, 2015

(65) Prior Publication Data

US 2016/0203639 A1 Jul. 14, 2016

(51) Int. Cl.
*G06T 7/20* (2017.01)
*G02B 27/01* (2006.01)

(52) U.S. Cl.
CPC ............. *G06T 7/20* (2013.01); *G02B 27/017* (2013.01); *G02B 2027/014* (2013.01); *G02B 2027/0138* (2013.01)

(58) Field of Classification Search
None
See application file for complete search history.

(56) References Cited

U.S. PATENT DOCUMENTS

| 5,900,849 A | 5/1999 | Gallery | |
| 8,483,754 B2* | 7/2013 | Rao | H04N 7/14 348/333.05 |
| 8,965,460 B1* | 2/2015 | Rao | G06F 3/005 455/566 |
| 9,189,021 B2* | 11/2015 | Jerauld | G06F 1/163 |
| 2011/0221793 A1* | 9/2011 | King, III | G02B 27/017 345/690 |

(Continued)

FOREIGN PATENT DOCUMENTS

WO 2010044837 A1 4/2010
WO 2013147704 A1 10/2013

OTHER PUBLICATIONS

P. Mell et al., "The NIST Definition of Cloud Computing", National Institute of Standards and Technology, Information Technology Laboratory, Special Publication 800-145, Sep. 2011, pp. 1-7.

(Continued)

*Primary Examiner* — Hilina K Demeter
(74) *Attorney, Agent, or Firm* — Law Office of Jim Boice

(57) ABSTRACT

Augmented reality glasses include: a wearable frame; a lens attached to the wearable frame; a positioning device for determining a physical location and a field of view of a user of the augmented reality glasses; a rule retrieval device that retrieves one or more rules that pertain to the physical location and field of view of the user; a graphical information generator that generates graphical information that delineates an area in the field of view and describes a rule that is related to an environment of the delineated area; and a display coupled to the wearable frame, where the display overlays the graphical information onto the lens of the wearable frame according to the field of view of the user.

18 Claims, 8 Drawing Sheets

(56) References Cited

U.S. PATENT DOCUMENTS

| | | | | |
|---|---|---|---|---|
| 2011/0283223 A1* | 11/2011 | Vaittinen | G01C 21/3647 | 715/781 |
| 2012/0242697 A1* | 9/2012 | Border | G02B 27/0093 | 345/633 |
| 2012/0320248 A1* | 12/2012 | Igarashi | G01C 21/32 | 348/333.01 |
| 2013/0085345 A1* | 4/2013 | Geisner | G06Q 30/00 | 600/300 |
| 2014/0016800 A1* | 1/2014 | Dong | G02B 27/02 | 381/151 |
| 2014/0085190 A1* | 3/2014 | Erinjippurath | G06F 3/012 | 345/156 |
| 2014/0098135 A1* | 4/2014 | Fein | G06F 3/048 | 345/633 |
| 2014/0192084 A1* | 7/2014 | Latta | G06F 21/10 | 345/633 |
| 2015/0002374 A1* | 1/2015 | Erinjippurath | G02B 27/0172 | 345/8 |
| 2015/0126845 A1* | 5/2015 | Jin | G02B 27/017 | 600/383 |
| 2015/0156803 A1* | 6/2015 | Ballard | G02B 27/017 | 455/422.1 |
| 2015/0293354 A1* | 10/2015 | Oishi | G08G 1/095 | 345/7 |
| 2015/0332620 A1* | 11/2015 | Sako | G06F 3/011 | 345/8 |

OTHER PUBLICATIONS

Anonymous, "Augmented Reality", Wikimedia Foundation, Inc., www.wikipedia.org, retrieved Jul. 30, 2014, pp. 1-21.

* cited by examiner

US 9,858,676 B2

DISPLAYING LOCATION-BASED RULES ON AUGMENTED REALITY GLASSES

BACKGROUND

The present disclosure relates to the field of augmented reality glasses, and specifically to the field of enhancing a display on augmented reality glasses. Still more specifically, the present disclosure relates to presenting location based rules on a display on augmented reality glasses.

SUMMARY

In an embodiment of the present invention, augmented reality glasses include: a wearable frame; a lens attached to the wearable frame; a positioning device for determining a physical location and a field of view of a user of the augmented reality glasses; a rule retrieval device, which retrieves one or more rules that pertain to the physical location and field of view of the user; a graphical information generator, which generates graphical information that delineates an area in the field of view and describes a rule that is related to an environment of the delineated area; and a display coupled to the wearable frame, where the display overlays the graphical information onto the lens of the wearable frame according to the field of view of the user.

In an embodiment of the present invention, a method alerts a user of wearable augmented reality eyeglasses of rules pertaining to an environment within a prescribed field of view. A positioning device determines a physical location of a user, and determines a field of view for the user at the physical location. A rule retrieval device receives one or more rules pertaining to one or more environments within the field of view. A display on the wearable augmented reality eyeglasses displays one or more icon representations associated with the one or more rules pertaining to the one or more environments within the field of view, where the one or more icon representations are overlaid over images of the one or more environments presented on a lens of the wearable augmented reality eyeglasses.

In an embodiment of the present invention, a system includes: an integration web application server, which has access to rules related to fields of view; and one or more augmented reality glasses, where each of the one or more augmented reality glasses includes: a wearable frame; a lens attached to the wearable frame; a positioning device for determining a physical location and a field of view of a user of the augmented reality glasses; a rule retrieval device that retrieves one or more rules that pertain to the physical location and field of view of the user; a graphical information generator that generates graphical information that delineates an area in the field of view and describes a rule that is related to an environment of the delineated area; and a display coupled to the wearable frame, where the display overlays the graphical information onto the lens of the wearable frame according to the field of view of the user.

DETAILED DESCRIPTION

Figure 1:
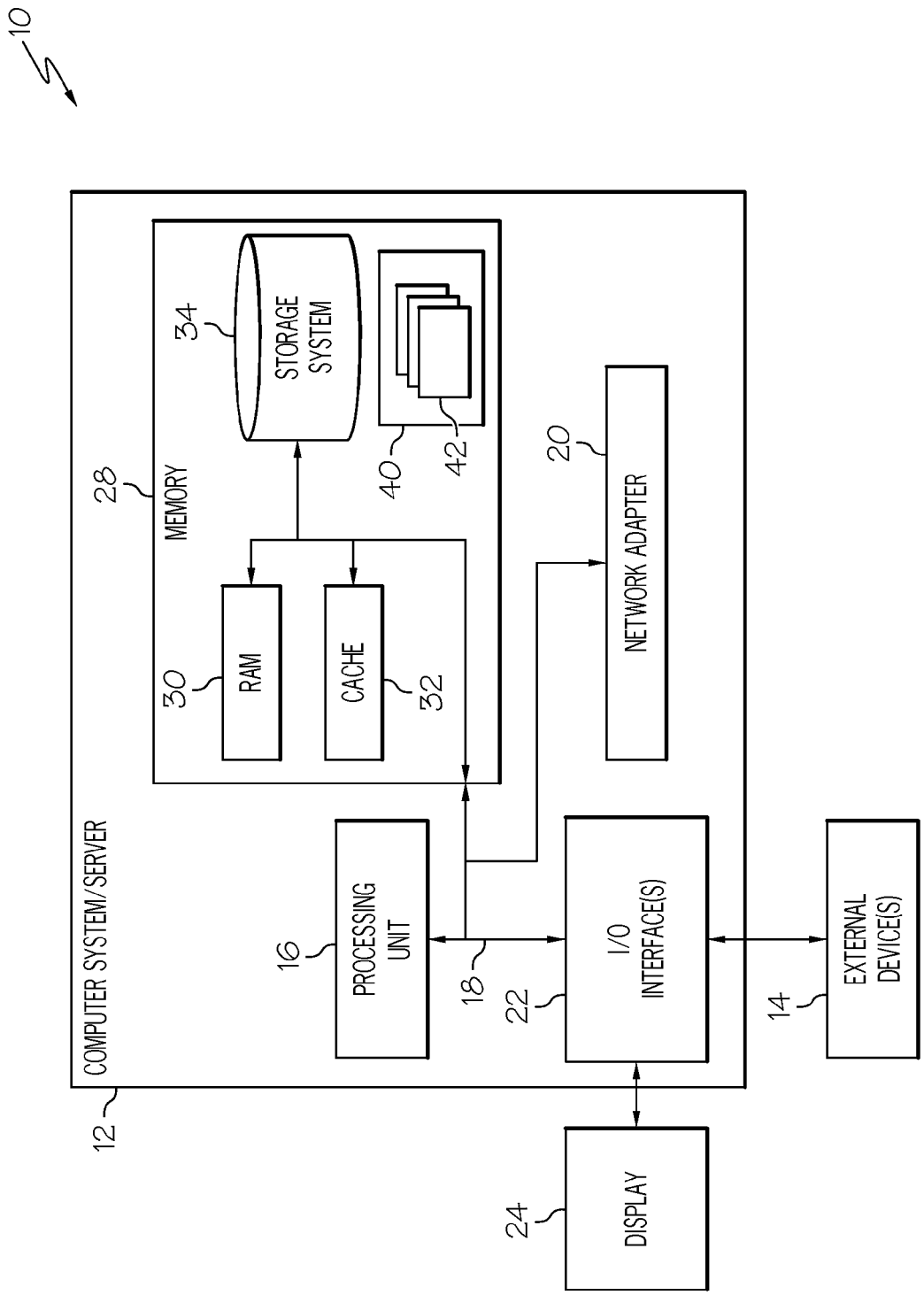
FIG. 1 depicts a cloud computing node according to an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that in one or more embodiments, the present invention is capable of being implemented in a cloud computing environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In one or more embodiments of the present invention, external devices 14 utilize the architecture of the computer system/server 12 shown in FIG. 1. Similarly, some or all of the architecture of computer system/server 10 can be implemented in the augmented reality glasses 400 in FIG. 4, the smart phone 500 in FIG. 5, the integration web application server 702 and internet application services server 712 in FIG. 7.

Figure 2:
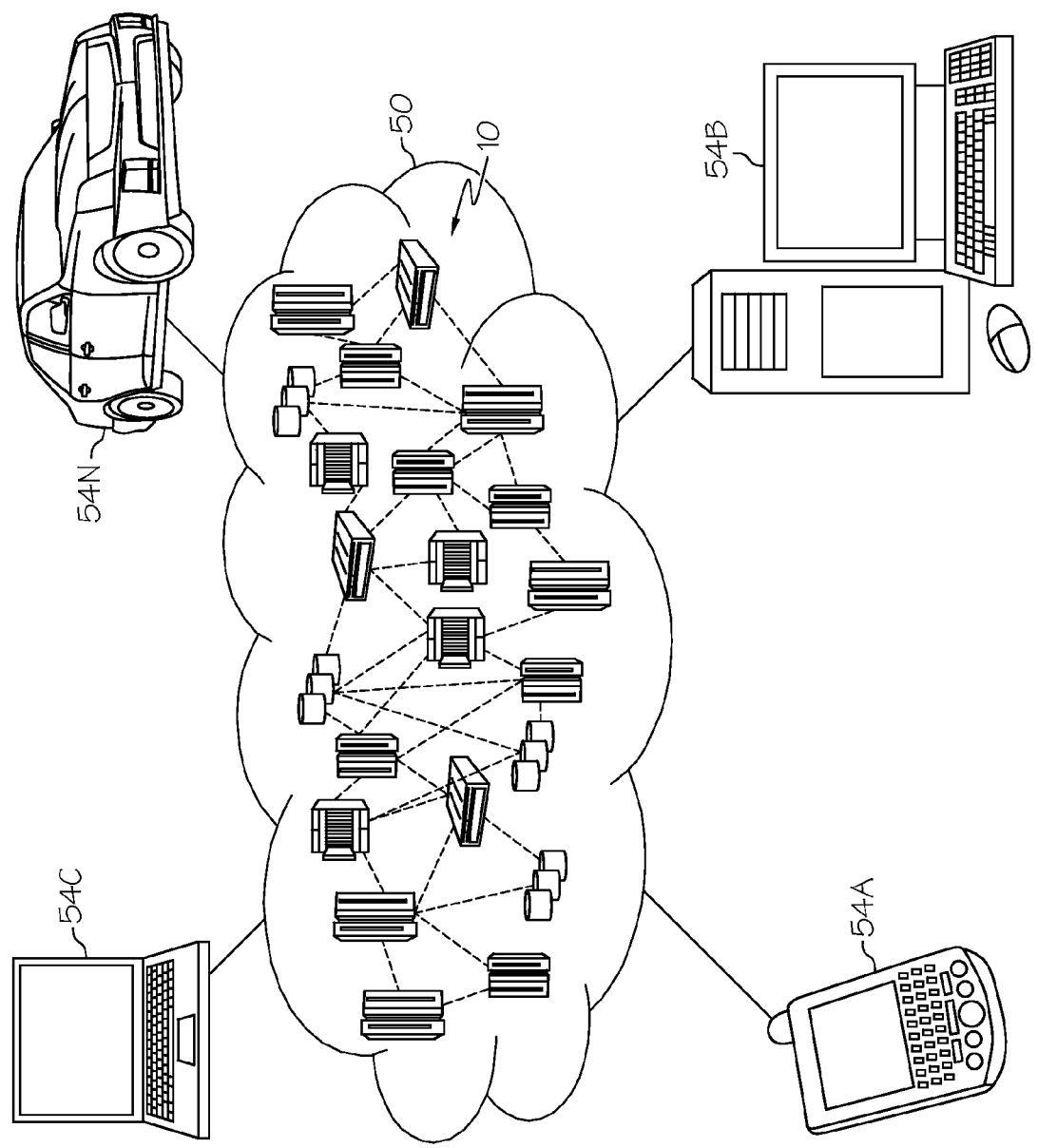
FIG. 2 illustrates a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
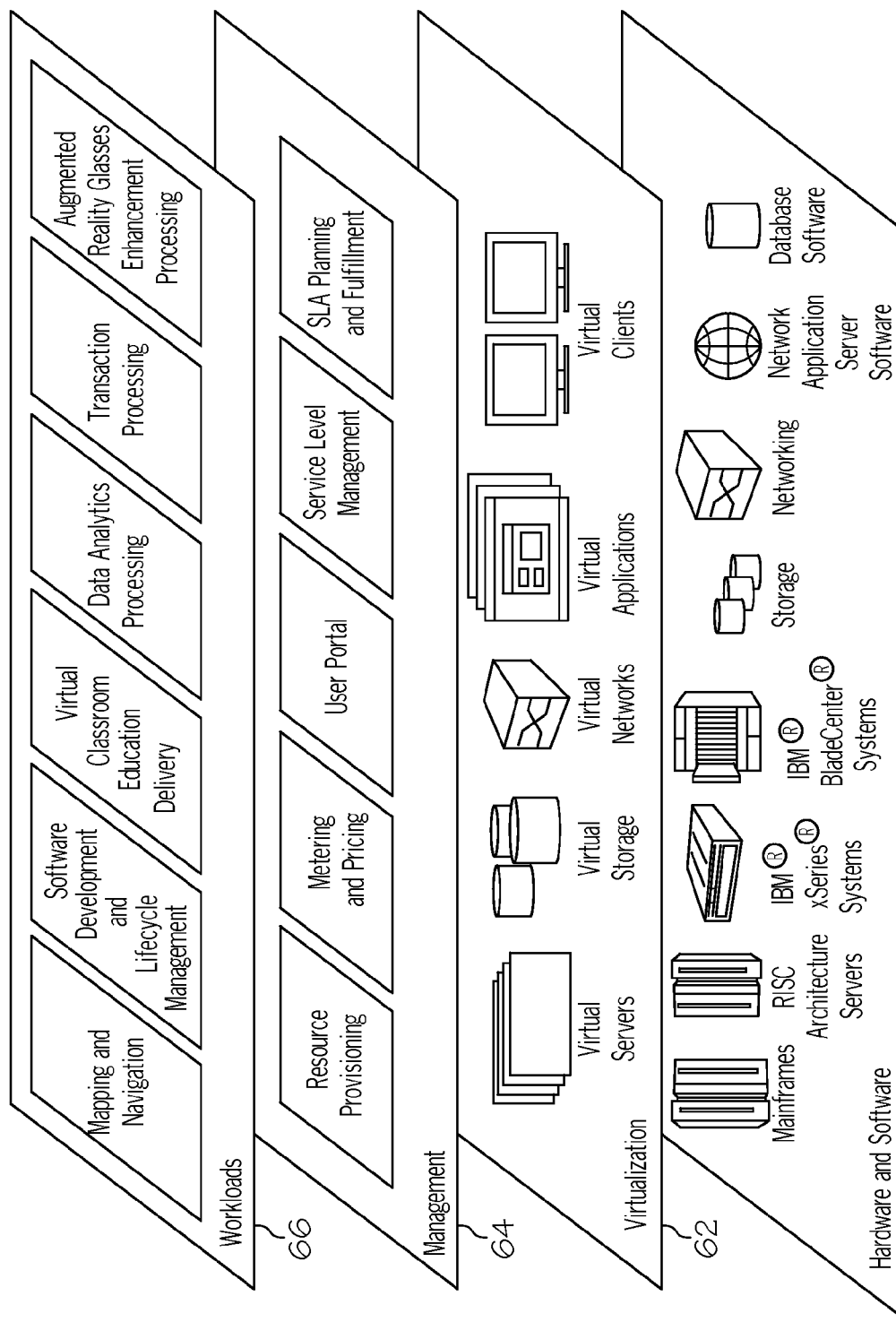
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and augmented reality glasses enhancement processing, as described herein, and as represented by the "Augmented Reality Glasses Enhancement Processing" found in workloads layer 66.

Figure 4:
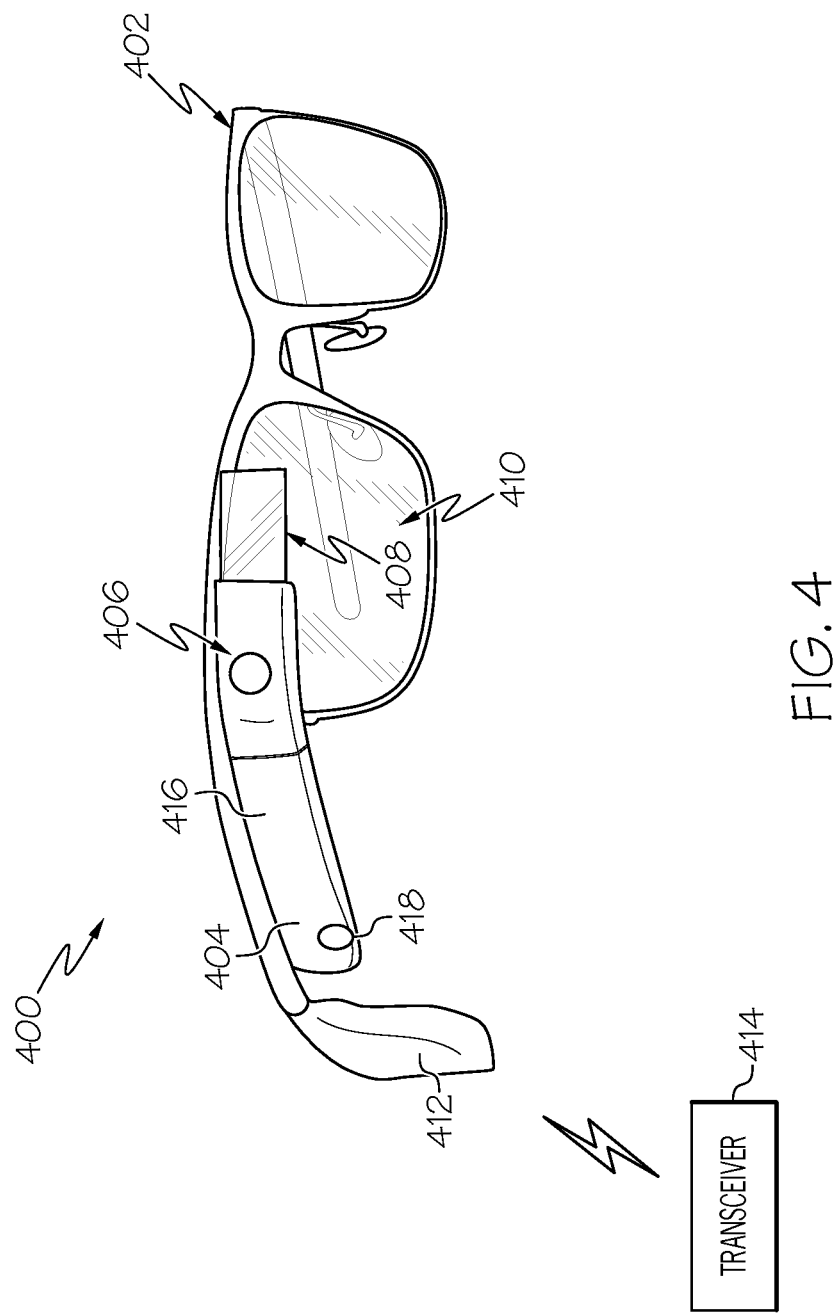
FIG. 4 illustrates exemplary augmented reality glasses that comprise novel features of one or more embodiments of the present invention.

With reference now to FIG. 4, exemplary augmented reality (AR) glasses 400 that comprise novel features of the present invention are presented. As shown, AR glasses 400 are based on a wearable frame 402, which a user wears like ordinary eyeglasses. A positioning device 404 determines a physical location and field of view (based on directional orientation) of a user of the wearable frame 402. For example, the positioning device 404 may include both a geographic locator (e.g., a global positioning system (GPS) device that utilizes signals from GPS satellites to determine the current position of the user/wearer) as well as orientation devices (e.g., accelerometers, 3-axis gravity detectors, etc.) that determine the direction that the user/wearer is looking ("field of view") while wearing the AR glasses 400.

A camera 406 is coupled to the wearable frame 402. The camera 406 captures an image of a field of view of the user of the wearable frame at the physical location of the user. That is, the camera 406 captures an electronic image of whatever the user is looking at while wearing the AR glasses 400. As described herein, the present invention is directed to overlaying information onto a user's field of view. In one embodiment, this information is overlaid onto a lens 410, such that what the person is seeing through the lens 410 is augmented with the overlaid information.

A display 408 is coupled to the wearable frame 402. The display 408 may be a small display device (e.g., a video screen such as a micro-LED display) that the wearer looks directly at, or it may be a projection device that displays images onto the lens 410. In one embodiment, the display 408 presents an image from the camera 406 to the user/wearer of the AR glasses 400. In a preferred embodiment, the display 408 projects augmentation information onto the lens 410 and/or presents the augmentation information on the display 408 itself. This augmentation information is related to rules about various locations, facilities, etc. within the field of view of the user/wearer of the AR glasses 404.

In another embodiment, the information is overlaid on an image that is captured by the camera 406 and displayed on the display 408 directly (e.g., when the display is a miniature light emitting diode (LED) display). In one embodiment, the image captured by the camera 406 is configurable by the system/user. For example, if the wearer of the AR glasses 400 has low-vision (e.g., is legally blind), then the image being presented to the wearer may be magnified or otherwise modified according to the needs of the wearer. Similarly, if the camera 406 is able to capture images in low-light conditions (e.g., using infrared or light-magnification technologies), then the artificial image from the camera 406 can be augmented/overlaid with the icons/delimitations described herein.

A rule retrieval device 412 retrieves one or more rules that pertain to the environment of the physical location of the field of view of the user. In one embodiment, the rule retrieval device 412 retrieves rules from a nearby transceiver 414, which may be part of a smart phone being carried by the wearer of the AR glasses 400. As discussed in detail below, the retrieved rules are relevant to specific environments, locations, facilities, conditions, etc.

A graphical information generator 416 generates visual information related to rules that relate to the specific environments, locations, facilities, conditions, etc. that the wearer is observing (i.e., are within his/her field of view). This visual information is then applied by the display 408, which overlays the visual information directly onto the display 408 (in the embodiment in which the camera 406 generates the user's field of view and the user looks directly at the display) or onto the lens 410 (in the embodiment in which the user looks through the lens at the field of view and the display 408 projects/overlays the visual information onto the lens 410).

Figure 5:
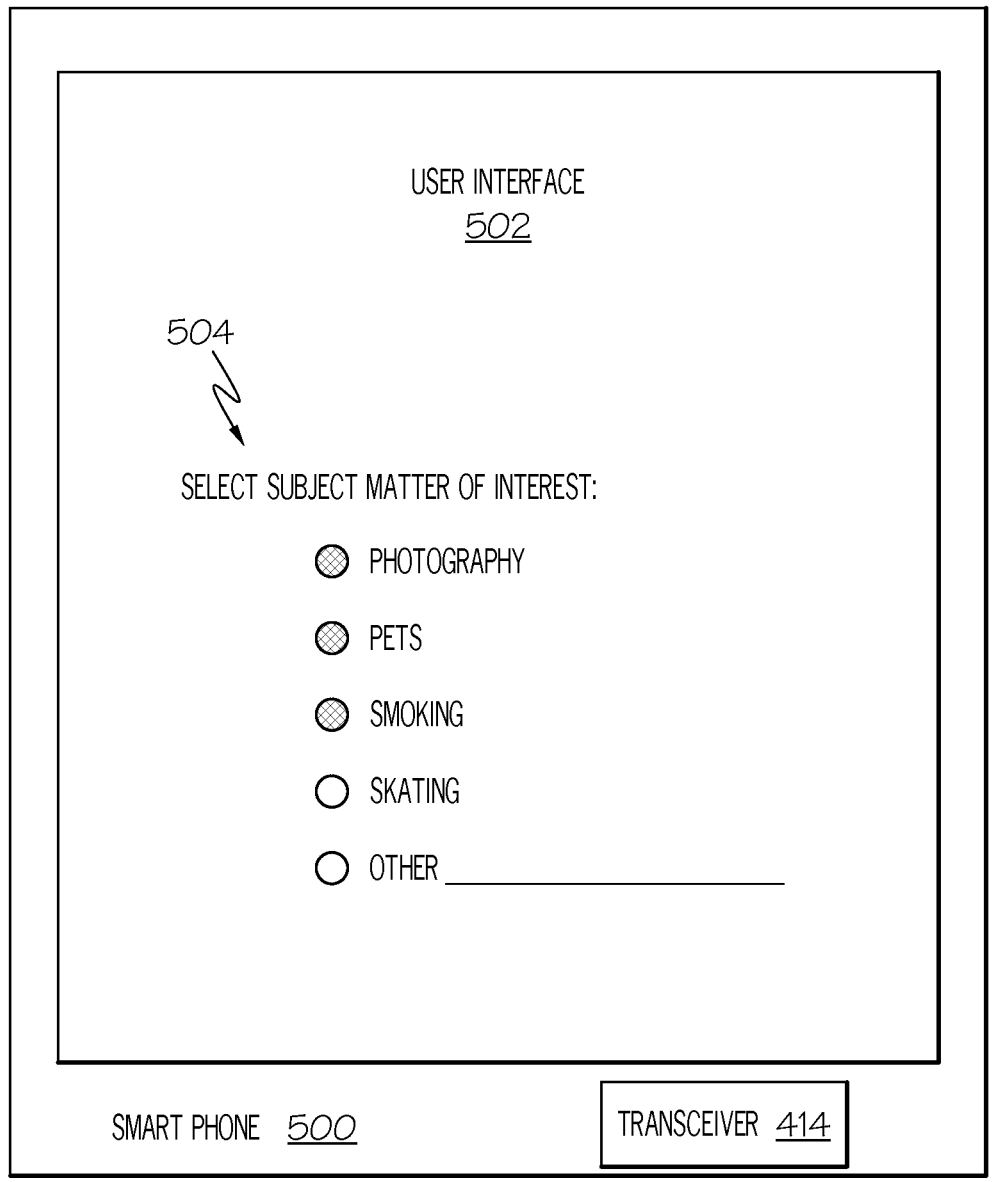
FIG. 5 depicts an exemplary user interface on a smart phone that can be utilized with the augmented reality glasses shown in FIG. 4.

In one embodiment, the decision by the system as to which rules/icons are applied are selected and/or filtered by the user/wearer of the AR glasses 400. For example, consider the smart phone 500 depicted in FIG. 5. Smart phone 500, which includes the transceiver 414 depicted in FIG. 4 for communicating with the AR glasses 400, has a user interface 502. As shown for explanatory purposes in FIG. 5, the user has been presented with a list of subject matters of interest in an interactive field 504. As shown in the example of FIG. 5, the user has indicated that he/she is interested in photography, pets, and smoking, but not in skating or any user-created topic. The system utilizes these selections to customize and augment the image being displayed on the display 408 of the AR glasses 400 shown in FIG. 4.

Figure 6:
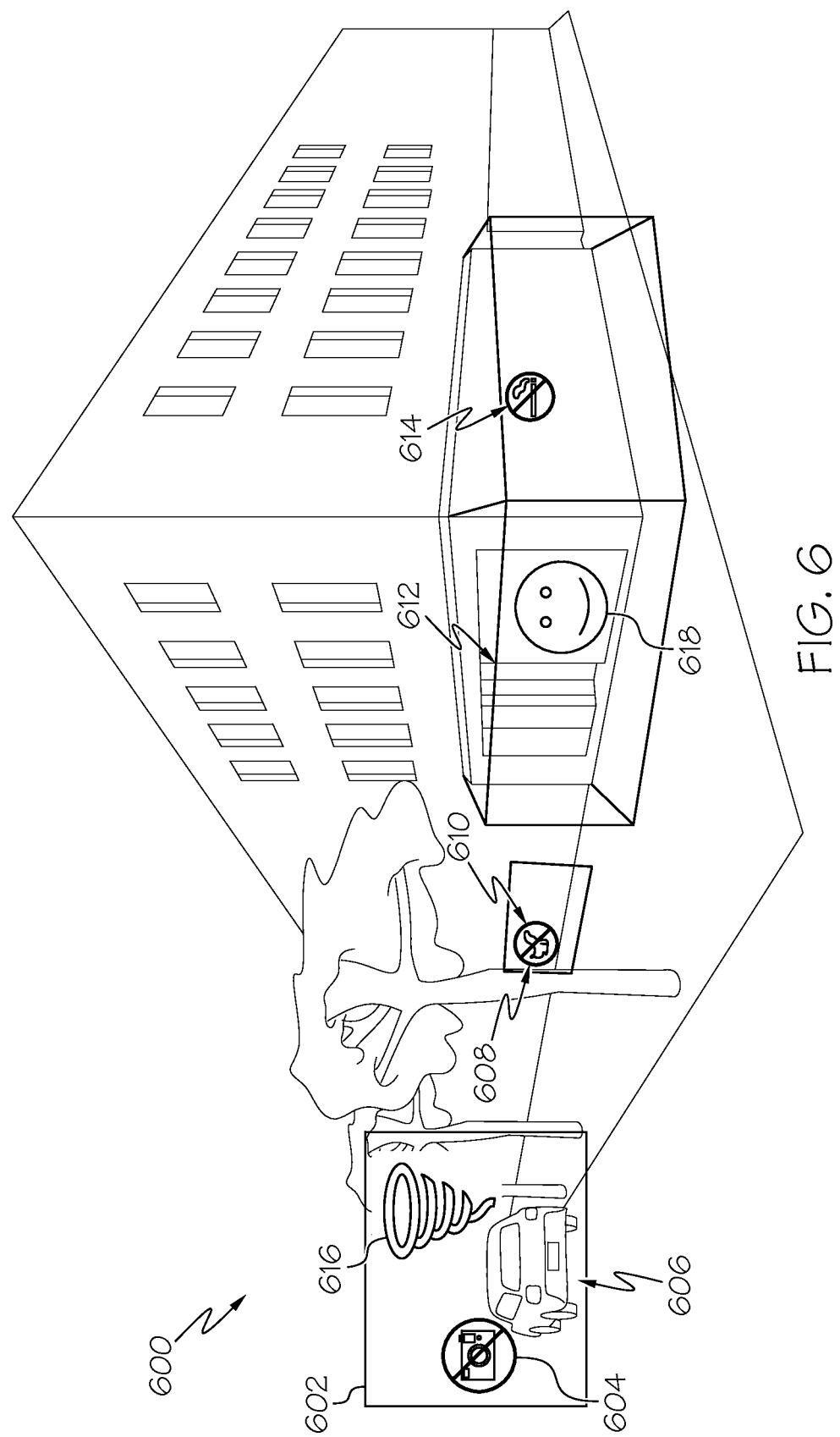
FIG. 6 illustrates an exemplary view of a display on the augmented reality glasses in accordance with one or more embodiments of the present invention.

For example, consider now FIG. 6, which illustrates an exemplary view 600 of the display 408 on the AR glasses 400 in accordance with one or more embodiments of the present invention. As indicated above, the view 600 may be what the wearer of the AR glasses 400 sees while looking through the lens 410 (with the graphical augmentation information being projected onto the lens 410 at the appropriate positions as the display 408 is in "projection" mode), or it may be what the wearer sees by looking directly at an electronic display (e.g., display 408 functioning in "display" mode).

Continuing with the example from FIG. 5, in which the user has indicated an interest in photography, pets, and smoking, the view 600 has been augmented with icons and specific areas to which rules related to photography, pets, and smoking apply.

For example, area 602 is highlighted/delineated as being an area in which photography is prohibited (e.g., for security purposes). An icon 604 gives the user a quick understanding that this area is off-limits to cameras. As described below, this rule ("no cameras allowed") is received from a rules server, which applies this rule/prohibition ("no cameras allowed") to the area 602 and/or to specific elements within area 602, e.g., specific vehicle 606. For example, vehicle 606 may be that of a high-level official, which a security service has determined should not be photographed for safety reasons.

Similarly, in area 608, dogs are not allowed, as highlighted/overlaid on the display by the icon 610. Similarly, smoking is not permitted in area 612, as highlighted/overlaid on the display by icon 614.

Note that while the user now knows that photography, pets, and smoking are prohibited in certain areas through which he/she is passing, no icons/areas show that skating (e.g., roller blading, skateboarding, etc.) is prohibited in this area (even though it might well be). As the user has not selected this topic from the interactive field 504 in FIG. 5, this information is not overlaid on the display.

While the overlaid areas/icons can be selected by the user/wearer as described above, in one embodiment certain areas/icons prepopulate the display. This allows the user to selectively remove any areas/icons that he/she is not interested in. For example, if the user decides that he/she really has no interest in knowing where dogs are prohibited (see area 608 in FIG. 6), the user can remove the area 608 and icon 610 by sending a "remove" signal by moving a cursor over the area using a touch device (e.g., a cursor control, not shown, on the touch screen that is the user interface 502) on the smart phone 500 in FIG. 5, or on a toggle 418 on the AR glasses 400 in FIG. 4.

Returning to FIG. 4, the transceiver 414 is able to receive rules, which are used to control which information is overlaid on the display 408. In various embodiments, these rules may be from a mapping service, a weather service, a social media service, etc. from a network environment. For example, consider FIG. 7, which depicts an exemplary network environment 700 that is used to enable one or more embodiments of the present invention. Together, the components shown in network environment 700 create a system for augmenting/enhancing a display on the AR glasses 400 shown in FIG. 4.

Figure 7:
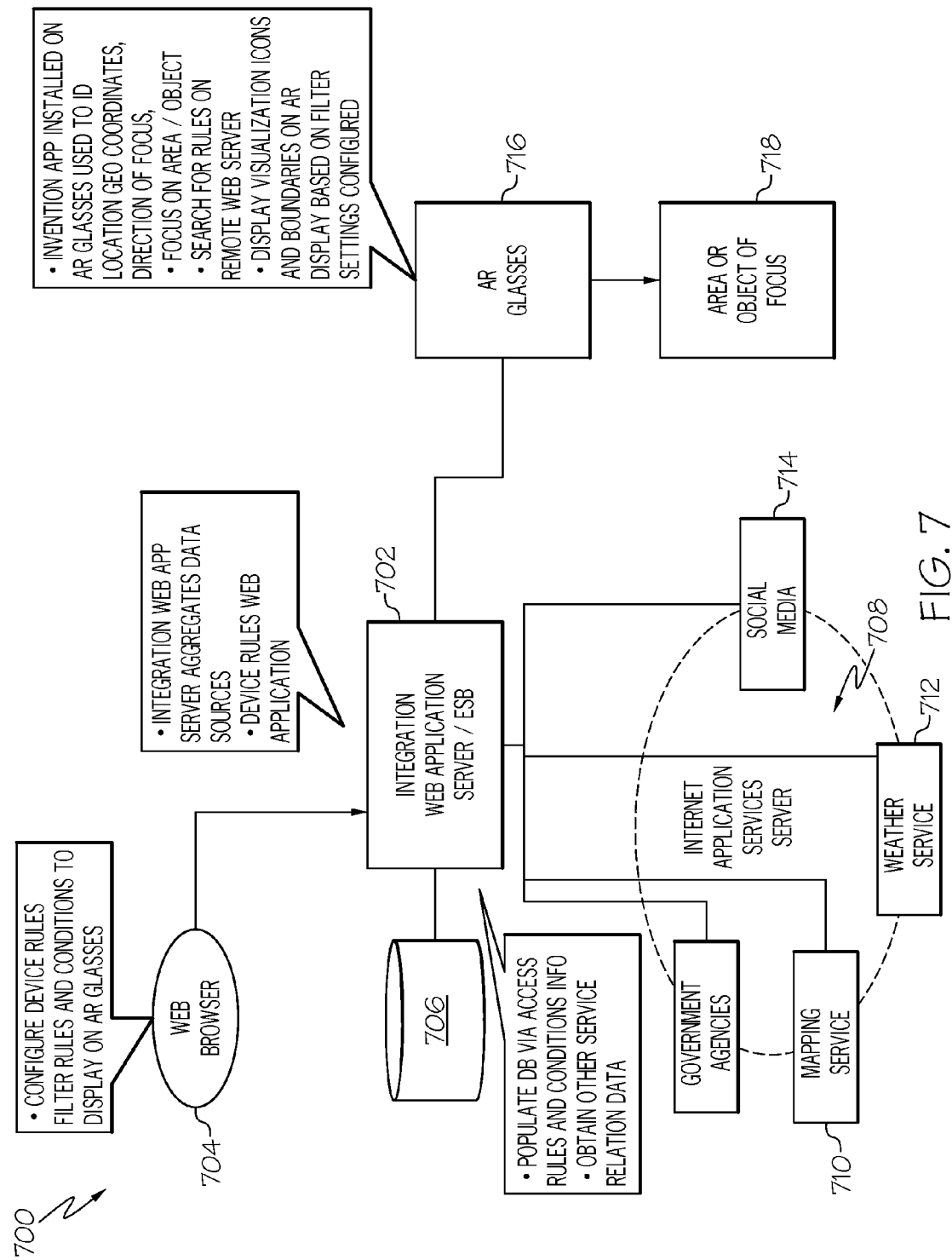
FIG. 7 depicts an exemplary network environment to enable one or more embodiments of the present invention.

As depicted in FIG. 7, an integration web application server 702 has access to rules related to fields of vision captured by AR glasses. These rules may be retrieved by a web browser 704 or other device associated with the integration web application server 702, which allows the integration web application server 702 to configure device rules and to filter rules and conditions to display on the AR glasses 716. While rules may be retrieved from the web browser 704 and/or from a local database stored on a storage device 706, such rules may also be retrieved from an internet application services server 708.

For example, as shown in FIG. 7, the internet application services server 708 may be associated with a mapping service 710. This mapping service 710 identifies which activities are prohibited at the physical location of the field of view. This identification can be made by the mapping service matching certain physical locations with certain rules in a database (not shown). By matching certain rules to specific locations, the integration web application server 702 can supply these rules to the AR glasses 716, which then utilize the retrieved rule(s) to augment/enhance the display on the AR glasses as described herein.

In an embodiment of the present invention, the transceiver 414 in FIG. 4 receives one or more rules from a weather service 712, which identifies current real-time weather conditions beyond the physical location of the field of view. For example, assume that a user is looking at area 602 in FIG.

6. There appears nothing untoward in the area. However, if the user were to continue traveling in this direction for 20 miles, he/she would be directly in the path of a tornado. The present invention provides this warning to the user as a weather icon 616, warning him/her of a tornado that is beyond his/her field of view. Similarly, if a road hazard (e.g., a large pothole) were reported (e.g., by a social media service) farther down the road, an icon (not shown) is displayed, warning the wearer that he/she will run into this hazard if he/she continues to travel in the direction of the wearer's field of view so highlighted.

In an embodiment of the present invention, the transceiver 414 in FIG. 4 receives one or more rules from a social media service 714 shown in FIG. 7. This social media service 714 provides various information about an area and/or a particular facility within the area. For example, in FIG. 6, assume that the social media service 714 reports numerous favorable recommendations for the store shown in area 612. A favorable icon 618 is thus displayed in area 612, which is specific for this store. The favorable icon 618 indicates the positive review of the store/facility that is within the physical location of the field of view shown as area 612.

Continuing now with FIG. 7, the integration web application server 702 is in communication (e.g., via transceiver 414 and rule retrieval device 412 in FIG. 4) with AR glasses 716. Each of the one or more AR glasses 716 comprises the components shown for AR glasses 400 in FIG. 4. As depicted in FIG. 7, the AR glasses 716 are enabled with one or more applications, which are installed on the AR glasses 716, to identify geographical coordinates (e.g., using GPS), direction of focus (e.g., using accelerometers, etc. to determine where the wearer is looking at any particular point in time), etc. This enables the system (including the AR glasses 716) to focus on the area/object that the user is looking at, and to then search for rules relevant to that area/object from the integration web application server 702. AR glasses 716, using the retrieved rules, then display visualization icons and boundaries on the AR display based on filter settings and other configurations.

Figure 8:
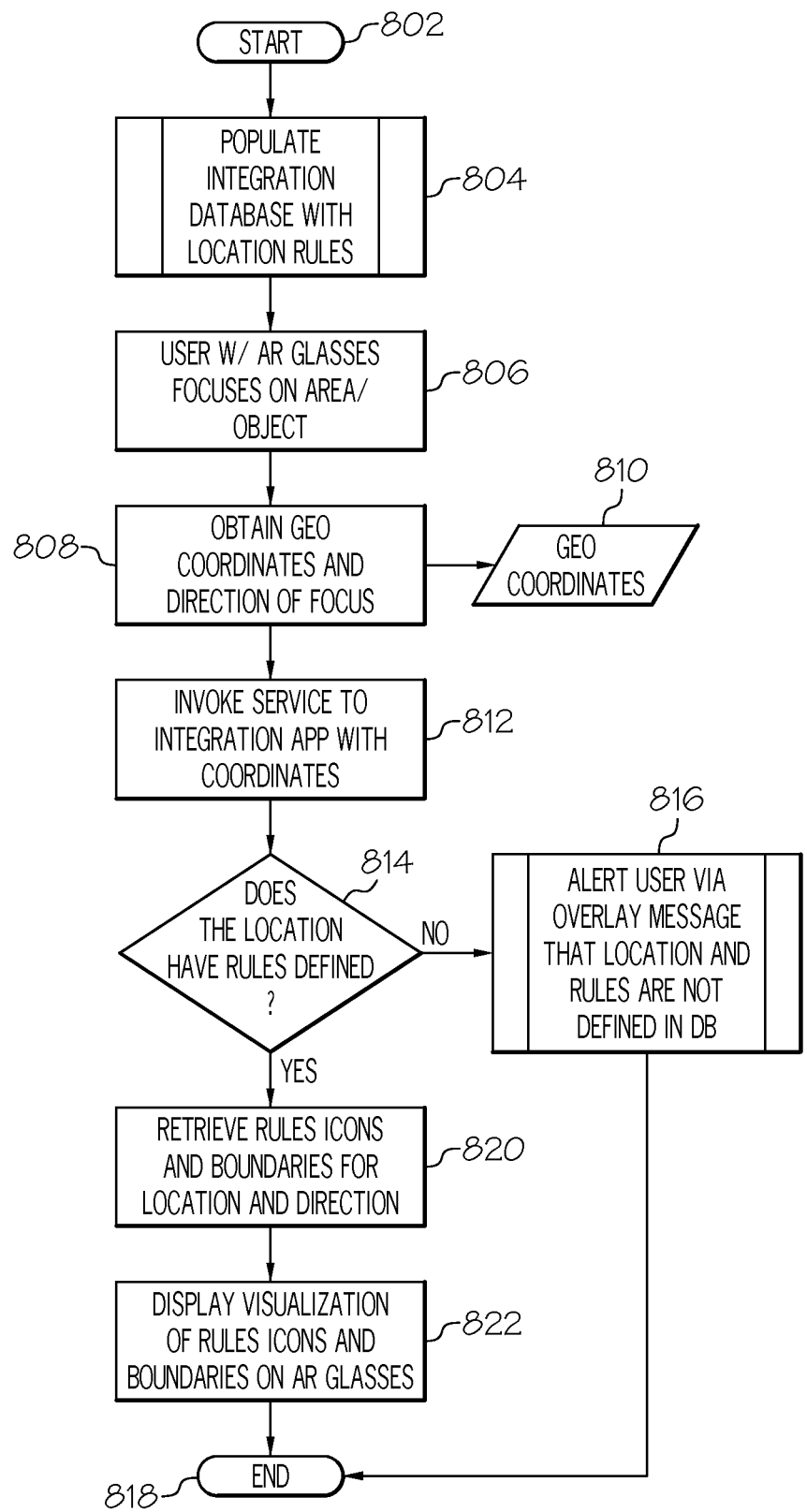
FIG. 8 is a high-level flow chart of one or more steps performed by one or more hardware devices to augment a display on augmented reality glasses with rules-based information according to facilities being presented in the display.

With reference now to FIG. 8, a high-level flow chart of one or more steps performed by one or more hardware devices to augment a display on augmented reality glasses with rules-based information according to facilities/environments/objects being presented in the display is presented.

After initiator block 802, an integration database (e.g., within storage device 706 in FIG. 7) is populated with location rules (block 804). A user of the AR glasses then focuses on a particular area/object (block 806), and the system obtains geographic and direction of focus information from sensors (e.g., the GPS and accelerometers) within the AR glasses, as described in block 808. That is, GPS coordinates are obtained (block 810) along with real-time orientation information describing where the user is looking.

As described in block 812, a service from the integration web application services server 702 in FIG. 7 is invoked, in order to determine if the location/object being viewed by the wearer of the AR glasses 400 has certain rules associated with it (e.g., "no dogs allowed", etc.). If not, then an alert overlay message is presented on the display, indicating that there are no known rules for that area/object (block 816). However, if there are rules associated with that particular area/object (block 814), then these rules are retrieved (block 820), thus allowing the display on the AR glasses to be modified in a manner described herein (block 822). The flow-chart ends at terminator block 818.

Thus, in an embodiment of the present invention, a method alerts a user of wearable augmented reality eyeglasses of rules pertaining to an environment within a prescribed field of view. A positioning device determines a physical location of a user and a field of view for the user at the physical location. A rule retrieval device receives one or more rules pertaining to one or more environments within the field of view. A display on the wearable augmented reality eyeglasses displays one or more icon representations associated with the one or more rules pertaining to the one or more environments within the field of view, wherein the one or more icon representations are overlaid over images of the one or more environments presented on a lens of the wearable augmented reality eyeglasses.

In an embodiment of the present invention, a rules receiving device receives a user input that defines the one or more rules. As described herein, the user input may be from the user selecting the one or more rules from a list of rules on a user interface, or it may be from the user generating a signal on the display rejecting one or more of the icon representations.

In an embodiment of the present invention, the method further comprises receiving, by the rules receiving device, the one or more rules from a mapping service, wherein the mapping service identifies which activities are allowed at the physical location of the field of view.

In an embodiment of the present invention, the method further comprises receiving, by the rules receiving device, the one or more rules from a weather service, wherein the weather service identifies current real-time weather conditions beyond the physical location of the field of view.

In an embodiment of the present invention, the method further comprises receiving, by the rules receiving device, the one or more rules from a social media service, wherein the social media service provides a recommendation review of facilities within the physical location of the field of view.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. Augmented reality glasses comprising:
a wearable frame;
a lens attached to the wearable frame;
a positioning device for determining a physical location and a field of view of a user of the augmented reality glasses;
a rule retrieval device, wherein the rule retrieval device retrieves one or more rules that pertain to the physical location and the field of view of the user, wherein the one or more rules identify one or more interests that have been identified by the user;
a receiver for receiving the one or more rules from a mapping service, wherein the mapping service identifies which prohibited activities are prohibited from being performed by the user at the physical location of the field of view, and wherein a graphical information generator generates icon representations describing the prohibited activities;
a display coupled to the wearable frame, wherein the display displays one or more of the icon representations associated with the one or more rules pertaining to the one or more environments within the field of view and the prohibited activities, wherein one or more of the icon representations are overlaid over images of the one or more environments presented on a lens of the wearable augmented reality eyeglasses;
a user input device for receiving a user input that defines the one or more rules, wherein the user input is from the user generating a signal that removes one or more of the icon representations from the display coupled to the wearable frame; and
one or more processors for:
determining that a vehicle within the field of view for the user at the physical location is transporting a particular person;
determining, based on a profile of the particular person, that photographing the particular person is unauthorized; and
in response to determining that photographing the particular person is unauthorized, overlaying a "no photography" icon over an image of the vehicle as presented on the lens of the wearable augmented reality eyeglasses.

2. The augmented reality glasses of claim 1, wherein the positioning device comprises a 3-axis positioning device and a geographical positioning device.

3. The augmented reality glasses of claim 1, wherein the user input is from the user selecting the one or more rules from a list of rules on a user interface of a smart phone.

4. The augmented reality glasses of claim 1, further comprising:
a receiver for receiving the one or more rules from a weather service, wherein the weather service identifies current real-time weather conditions beyond the physical location of the field of view.

5. The augmented reality glasses of claim 1, further comprising:
a receiver for receiving the one or more rules from a social media service, wherein the social media service provides a recommendation review of facilities within the physical location of the field of view.

6. The augmented reality glasses of claim 1, wherein the activities that are prohibited are from a group consisting of photography, smoking, and pet accompaniment.

7. The augmented reality glasses of claim 1, wherein the rule retrieval device retrieves the one or more rules from a smart phone being carried by the user.

8. A method for alerting a user of wearable augmented reality eyeglasses of rules pertaining to an environment within a prescribed field of view, the method comprising:
determining, by a positioning device, a physical location of a user;
determining, by the positioning device, a field of view for the user at the physical location;
retrieving, by a rule retrieval device, one or more rules pertaining to one or more environments within the field of view, wherein the one or more rules identify one or more interests that have been identified by the user;
receiving, by a receiver associated with a computing device, the one or more rules from a mapping service, wherein the mapping service identifies which prohibited activities are prohibited at the physical location of the field of view, and wherein the graphical information generator generates icon representations describing the prohibited activities;
displaying, by a display on wearable augmented reality eyeglasses, one or more of the icon representations associated with the one or more rules pertaining to the one or more environments within the field of view and the prohibited activities, wherein one or more of the icon representations are overlaid over images of the one or more environments presented on a lens of the wearable augmented reality eyeglasses;
receiving, by a user input device, a user input that defines the one or more rules, wherein the user input is from the user generating a signal on the display that removes one or more of the icon representations from the display coupled to the wearable frame;
determining, by one or more processors, that a vehicle within the field of view for the user at the physical location is transporting a particular person;
determining, by one or more processors, and based on a profile of the particular person, that photographing the particular person is unauthorized; and
in response to determining that photographing the particular person is unauthorized, overlaying a "no photography" icon over an image of the vehicle as presented on the lens of the wearable augmented reality eyeglasses.

9. The method of claim 8, wherein the display is a projector, and wherein the projector overlays the images on the lens.

10. The method of claim 8, wherein the display is a video screen, wherein the images are overlaid directly onto the video screen.

11. The method of claim 8, further comprising:
receiving, by a rules receiving device, a user input that defines the one or more rules.

12. The method of claim 8, further comprising:
receiving, by the rules receiving device, the one or more rules from a mapping service, wherein the mapping service identifies which activities are allowed at the physical location of the field of view.

13. The method of claim 8, further comprising:
receiving, by the rules receiving device, the one or more rules from a weather service, wherein the weather service identifies current real-time weather conditions beyond the physical location of the field of view.

14. The method of claim 8, further comprising:
determining, by an integration web application server, that the user has low vision; and
in response to determining that the user has low vision, magnifying the images of the one or more environments that are of interest to the user that has low vision.

15. The method of claim 8, wherein an image presented on the lens of the wearable augmented reality eyeglasses is a retail establishment, and wherein the method further comprises:
receiving, by the receiver on the wearable augmented reality glasses, a plurality of favorable reports about the retail establishment, wherein the plurality of favorable reports are from a social media service; and
in response to receiving the plurality of favorable reports about the retail establishment, overlaying a "favorable icon" over an image of the retail establishment as presented on the lens of the wearable augmented reality eyeglasses.

16. A system comprising:
an integration web application server, wherein the integration web application server has access to rules related to fields of view; and
one or more augmented reality glasses, wherein each of the one or more augmented reality glasses comprises:
a wearable frame;
a lens attached to the wearable frame;
a positioning device for determining a physical location and a field of view of a user of the augmented reality glasses;
a rule retrieval device, wherein the rule retrieval device retrieves one or more rules that pertain to the physical location and the field of view of the user, wherein the one or more rules identify one or more interests that have been identified by the user;
a receiver for receiving the one or more rules from a mapping service, wherein the mapping service identifies which prohibited activities are prohibited at the physical location of the field of view, and wherein a graphical information generator generates icons describing the prohibited activities;
a display coupled to the wearable frame, wherein the display displays one or more of the icon representations associated with the one or more rules pertaining to the one or more environments within the field of view and the prohibited activities, wherein one or more of the icon representations are overlaid over images of the one or more environments presented on a lens of the wearable augmented reality eyeglasses;
a user input device for receiving a user input that defines the one or more rules, wherein the user input is from the user generating a signal on the display that removes one or more of the icon representations from the display coupled to the wearable frame; and
one or more processors for:
determining that a vehicle within the field of view for the user at the physical location is transporting a particular person;
determining, based on a profile of the particular person, that photographing the particular person is unauthorized; and
in response to determining that photographing the particular person is unauthorized, overlaying a "no photography" icon over an image of the vehicle as presented on the lens of the wearable augmented reality eyeglasses.

17. The system of claim 16, wherein at least one of the one or more augmented reality glasses further comprises:
a user input device for receiving a user input that defines the one or more rules.

18. The system of claim 16, further comprising:
a services server, wherein the services server provides a mapping service to at least one of the one or more augmented reality glasses, and wherein the mapping service identifies which activities are allowed and which activities are prohibited at the physical location of the field of view.

* * * * *